Feb. 26, 1963
J. M. GÁLVEZ
3,078,580
DENTAL APPLIANCE
Filed Oct. 12, 1961
2 Sheets-Sheet 1
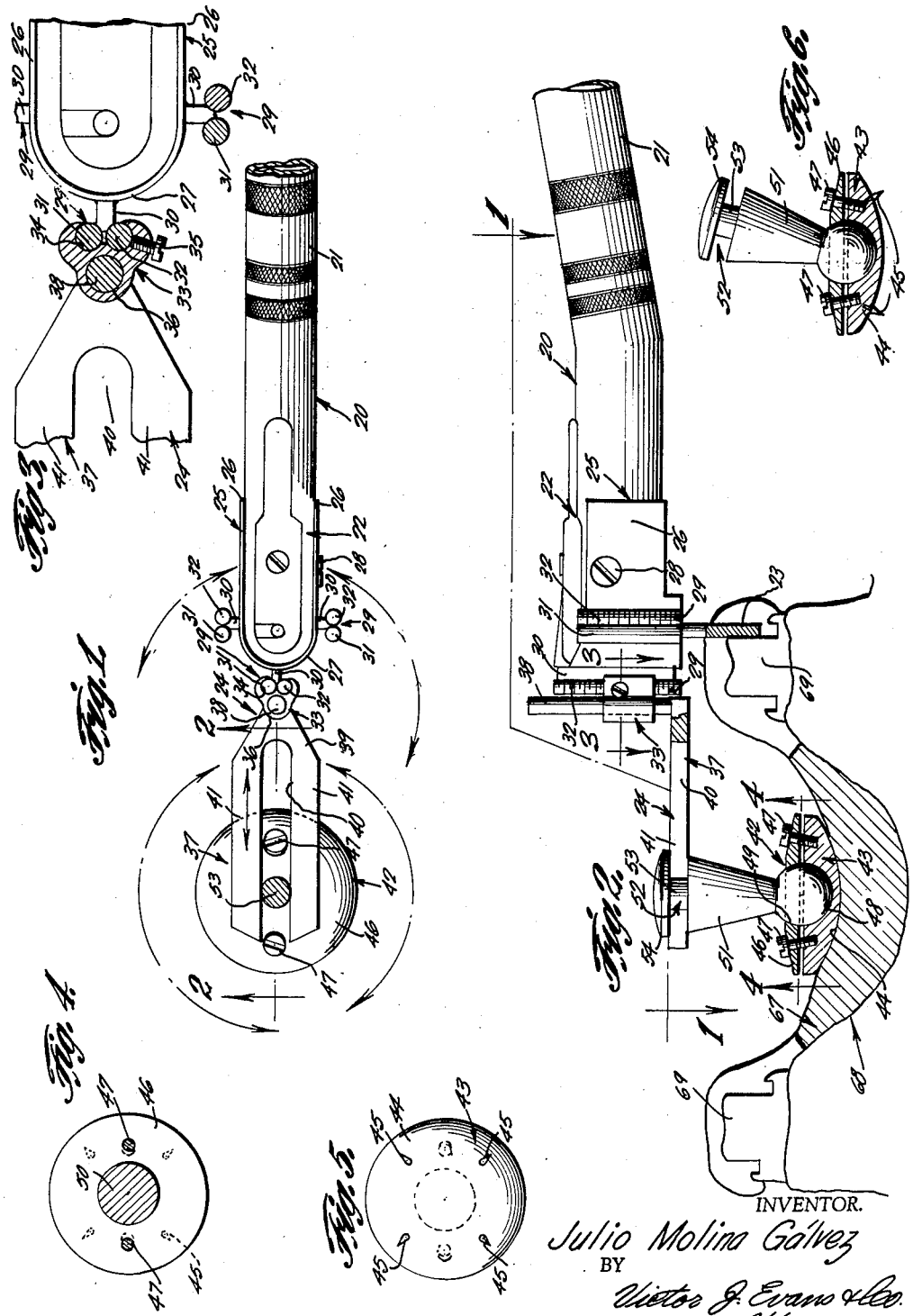
INVENTOR.
Julio Molina Gálvez
BY
Victor J. Evans & Co.
Attorneys Feb. 26, 1963
J. M. GÁLVEZ
3,078,580
DENTAL APPLIANCE
Filed Oct. 12, 1961
2 Sheets-Sheet 2
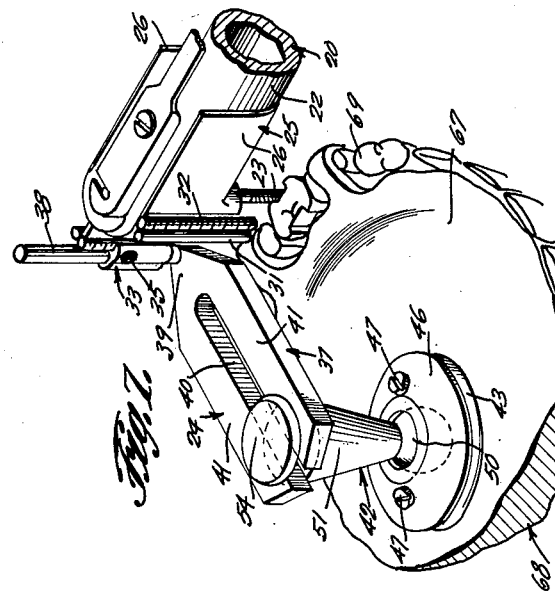
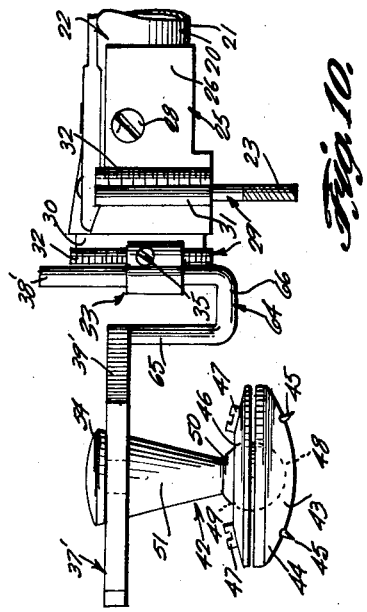
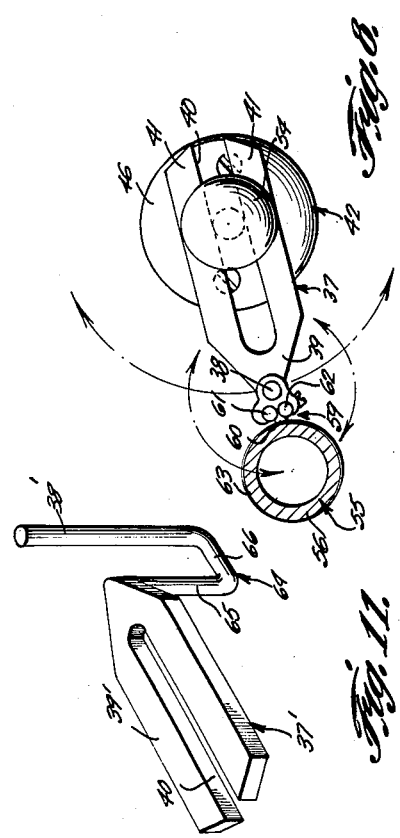
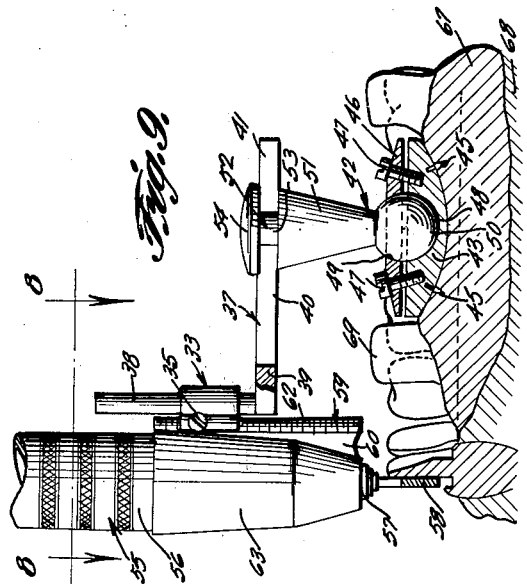
INVENTOR.
Julio Molina Gálvez
BY
Victor J. Evans & Co.
Attorneys United States Patent Office 3,078,580
Patented Feb. 26, 1963

3,078,580
DENTAL APPLIANCE
Julio Molina Gálvez, 9a Calle O-13, Zona 1,
Guatemala City, Guatemala
Filed Oct. 12, 1961, Ser. No. 144,594
3 Claims. (Cl. 32—67)

This invention relates to a dental hand piece, and more particularly to a unit or appliance for use with a dental hand piece and wherein the present invention is adapted to facilitate the obtaining of the necessary parallelism that is necessary in various types of dental work such as formation of dental bridge work.

The primary object of the present invention is to provide a dental appliance which permits parallelism to be accurately and readily obtained so that dental bridge work can be accomplished more accurately and readily.

Another object of the present invention is to provide a device for helping to eliminate failures that occur in making bridge work due to difficulty in obtaining parallelism, and wherein the present invention is constructed so that the dental cutting instrument will be guided in a fixed predetermined path so that all cuts made on the teeth will be parallel to each other in the desired or required manner.

A further object is to provide a device of the character described that is rugged in structure and foolproof in use and which is economical to manufacture and efficient in operation, and wherein the present invention is readily operable or usable by the dentist.

These and other objects of the invention will become apparent from a reading of the following specification in point, together with the accompanying drawings, wherein like parts are referred to and indicated by like reference characters and wherein:

FIGURE 1 is a fragmentary plan view illustrating the dental appliance of the present invention, and taken generally on the line 1—1 of FIGURE 2.

FIGURE 2 is an enlarged sectional view taken on the line 2—2 of FIGURE 1.

FIGURE 3 is a sectional view taken on the line 3—3 of FIGURE 2.

FIGURE 4 is a sectional view taken on the line 4—4 of FIGURE 2.

FIGURE 5 is a bottom plan view of the base piece.

FIGURE 6 is a fragmentary sectional view showing certain constructional details of the support unit.

FIGURE 7 is a fragmentary perspective view, with parts broken away and in section, illustrating the present invention being used.

FIGURE 8 is a sectional view taken on the line 8—8 of FIGURE 9 and illustrating a modification.

FIGURE 9 is an elevational view, with parts broken away and in section, illustrating the modification of FIGURE 8 being used.

FIGURE 10 is an elevational view of a further modification, with parts broken away and in section.

FIGURE 11 is a perspective view showing certain constructional details of the modification of FIGURE 10.

Referring in detail to the drawings, and more particularly to FIGURES 1 through 7 of the drawings, the numeral 20 indicates a portion of a dental hand piece of the type that includes a bottom member or casing 21, and the hand piece 20 further includes the usual head 22 from which is driven the bur or drill 23, FIGURE 2.

According to the present invention there is provided a guiding mechanism which is indicated generally by the numeral 24, and the guiding mechanism 24 includes a cover which is indicated generally by the numeral 25, and as shown in FIGURE 1 for example, the cover 25 embraces or engages a portion of the head 22, and the cover 25 includes spaced apart generally flat side sections 26 as well as an arcuate end section 27. The cover 25 is adapted to be fastened in place on the head 22 as for example by means of a securing element or screw member 28.

The numeral 29 designates each of a plurality of rail units which are suitably secured to or formed integral with the cover 25, and as shown in FIGURE 1 there are three of the rail units 29, one of the rail units being affixed to each side section 26, and one rail unit being secured to or formed integral with the end section 27. As shown in the drawings, the rail units each have the same construction and each include a support element 30 that extends from the cover and is secured to or formed integral therewith, and that is provided a pair of space apart cylindrical pins 31 and 32 that are secured as by welding to the support element or stub section 30. The pin 32 has graduations or scale markings thereon for a purpose to be later described.

The numeral 33 indicates a clamp, FIGURE 3, and the clamp 33 is shaped to include or embody a pair of arcuate grooves 34 that are arranged adjacent each other, and these grooves 34 are adapted to receive or engage the pins 31 and 32, and the numeral 35 indicates a set screw which is adapted to extend through a portion of a clamp 33 for engaging a pin to maintain the clamp immobile in its adjusted position. By loosening the set screw 35 the clamp 33 can be adjusted or disengaged from the pin. The clamp 33 further includes a cylindrical bore or opening 36 through which extends a cylindrical stem 38 that forms part of a bracket 37. The bracket 37 embodies or comprises a body piece 39 which is provided with an elongated slot 40 therein, whereby there is defined in the body piece a pair of spaced apart arms 41, FIGURE 1.

The body piece 39 is arranged at right angles with respect to the shank 38.

As shown in the drawings, there is further provided a support unit which is indicated generally by the numeral 42, and the support unit 42 comprises a base piece 43 which has a lower rounded surface 44, and a plurality of spaced apart pointed prongs 45 depend from the base piece 43. There is further provided a retainer or ring 46 which is adapted to be connected to the base piece 43 by means of securing elements or screws 47, and there is provided in the retainer 46 and the base piece 43 coacting opposed arcuate recesses 49 and 48 for receiving therein a ball member 50. The numeral 51 indicates a tapered stem which is secured to or formed integral with the ball member 50, and there is provided in the upper portion of the stem 51 an annular groove 52 which is defined by a reduced diameter portion 53 and a top section or portion 54, FIGURE 6. The annular groove 52 is adapted to engage the slot 40 and arms 41 of the body piece 39 as shown in the drawings.

Referring now to FIGURE 9 of the drawings, there is illustrated a modified or different type of dental hand piece which is indicated by the numeral 55, and the dental piece 55 includes a body portion 56 as well as a head 57 from which is driven the bur or drill 58, and the numeral 63 indicates a cover which is suitably secured to the head portion of the appliance 55. A rail unit 59 is secured to or formed integral with the cover 63, and as shown in the drawings, the rail unit 59 includes a support element 61 that is secured to or formed integral with the cover 63, and there is provided a pair of cylindrical pins 61 and 62 which are secured to or formed integral with the support element 60, and one of these pins is adapted to have graduations or scale markings thereon.

Attention is now directed to FIGURE 10 and FIGURE 11 of the drawings wherein there is illustrated a further modification showing the numeral 37' indicates a modified bracket which is adapted to be used in lieu of or instead of the bracket 37, and it will be seen that the bracket 37' includes a body piece or flat section 39', and there is provided a connecting means which is indicated by the numeral 64, and the connecting means 64 includes a first portion or section 65 which depends from an end of the body piece 39' and which is secured thereto or formed integral therewith, and there is provided a second portion 56 which is arranged at right angles with respect to the lower end of the first portion 65, and there is also provided an upstanding third portion 38' which is arranged at right angles with respect to the second portion 66, and the third portion 38' defines or provides a shank for engaging the bore 36 in the clamp 33.

From the foregoing, it is apparent that there has been provided a device which is especially suitable for use by dentists and wherein the present invention will permit drilling and the like to be accomplished more accurately and easily and wherein with the present invention there will be less failures or rejects in the making of dental bridge work.

In use, with the parts arranged as shown in the drawings, and more particularly as shown in FIGURES 1 through 7 of the drawings, it will be seen that a conventional dental hand piece 20 is adapted to have the mechanism 24 of the present invention attached thereto, and this is accomplished by connecting or mounting the cover 25 on the head of the dental hand piece through the medium of the securing element 28. The cover 25 has a plurality of rail units 29 affixed thereto, and due to the provision of the rail units 29, the clamp 33 can be arranged in engagement with different of these rail units in order to permit adjustment or location of the parts in a particular area of the patient's mouth as desired or required. The clamp 33 is provided with the recesses 34 which snugly receive therein the pins 31 and 32, and the calibrations or graduations on the pins 32 provide a means whereby the clamp 33 can be accurately positioned or located by observing the graduations therein so that precision work can be readily carried out. The set screw 35 can be tightened after the clamp 33 has been moved to its desired adjusted location, whereby with the set screw 35 tightened, the clamp 33 will be maintained stationary in its desired adjusted position with respect to a particular rail unit. The clamp 33 also has the bore or opening 36 through which extends the shank 38, and the body piece 39 is integral with the shank 38. The body piece 39 is provided with the slot 40 which engages the groove 52, and the stem 51 has the ball member on the lower end thereof which is held in place in the recesses 48 and 49 due to the provision of the coacting retainer 46 and base piece 43, and the retainer 46 and base piece 43 are fastened together with the screws or bolts 47.

With further regard to the modification of FIGURES 8 and 9, it will be seen that a different type of dental hand piece 55 is illustrated, and the drill 58 is adapted to be suitably driven from its head 57, and a cover 63 is adapted to be mounted on the hand piece 55 in any suitable manner. One or more rail units 59 are suitably affixed to the cover 63, and the rail unit 59 serves the same purpose as the previously described rail units 29. That is, the clamp 33 is adapted to have its recesses 34 engage the pins 61 and 62 of the rail unit 59, and the set screw 35 provides a means whereby the clamp 33 is held stationary with its adjusted position, and graduations on the pin 55 permit accurate adjustment or setting of the parts. Otherwise the construction and use of the device shown in FIGURES 8 and 9 is substantially the same as the device described in detail in connection with the arrangement of FIGURES 1 through 7.

Considering further the modification of FIGURES 10 and 11, it will be seen that there is provided a modified bracket 37' which has the connecting means 64 that is different from the construction shown in FIGURES 1 through 7, and the connecting means 64 includes the portions 65, 66 and 38' which provide a somewhat offset arrangement that is useful when performing certain types of dental work on a patient. The shank 38' is adapted to engage the bore 36 in the same manner as the previously described shank 38.

The parts can be made of any suitable material and in different shapes or sizes.

The present invention is easy to handle and manipulate and can be readily controlled, and the mechanism of the present invention provides an accurate and calibrated gauge for use by the dentist when cutting or drilling teeth for fixed and precision bridge work or when performing other types of dental work on teeth of a patient's mouth. The present invention facilitates and ensures precise paralleling of various preparations, and the present invention will serve as a convenient guide for the modifications of teeth.

In most cases where dental bridge work is being performed, it is necessary that all cuts that are to be made on the bridge abutments be parallel to each other, since if they are not bridge work will not be properly fitted in place. Ordinarily such parallelism is obtained by sight without using any mechanical guide, and because of this, such steps in fixed bridge work is one of the most difficult to be performed undertaken, and also this accounts for most of the failures in this type of work. The parallelograph of the present invention eliminates this difficulty or source of failure because it guides the dental cutting instruments that are attached to the hand piece in a fixed predetermined path so that all cuts made on the teeth are parallel to each other.

With further reference to the drawings, it will be noted that base piece 43 has the retention pins or prongs 45 which serve to fix the apparatus in place, and the ring or retainer 46 is connected to the base piece 43 by means of the screws 47 whereby the ball 50 will be retained in position, and the ball 50 is part of the stem 51. The stem can rotate in all directions due to the positioning of the ball member 50 in the recesses 49 and 48, so that the stem 51 can be positioned in different inclined positions, and there is provided the annular groove 52 on the upper end of the stem 51, and with the groove 52 coacting with or interfitting with the slot or groove 50, it will be seen that the body piece 39 is free to move through the groove 52.

The piece 39 has a generally U-shaped configuration as shown in FIGURE 1, and the piece 39 and shank 38 are fixedly secured together, the shank 38 being vertically disposed, and due to the positioning or projecting of the shank 38 through the bore 36, it will be seen that the body piece 39 can pivot or swivel in a direction about an axis that extends through the shank 38.

The cover such as the cover 25 is adapted to be affixed to the head of the hand piece, and the cover 25 has the three rails 29 affixed thereto.

The cover 63 of FIGURES 8 and 9 functions as an adaptor to permit the present invention to be used with a vertical hand piece 55.

The clamp 33 serves to connect the bracket 37 to a rail unit 29 or 59, and the screw 35 permits the clamp to be fixed at a convenient height, and it will be seen that with the present invention horizontal or vertical adjustment can be readily accomplished, as desired or required.

When the device is ready to be used, the drill or bur 23 or 58 is always parallel to the shank 38 or 38' and also is always parallel to the stem 51, and even though the apparatus is fixed in place, the hand piece which holds the bur can move freely to make the necessary cuts on any of the teeth of the dental archs, and these cuts will be parallel to each other because of the direction of the movement is determined by the fixed stem 51 and is guided by the body piece 39. The bracket 37' of FIGURES 10 and 11 can be used interchangeably with the bracket 37 when ever desired or required.

When using the present invention, initially a plastic base 67 is adapted on a model of the mouth of the patient, and the base piece 43 of the parallelograph of the present invention is fixed on the center of the plastic base 67. Then, the stem 51 is fixed in the desired inclined position, and next the plastic base 67 with the piece 43 fixed in the center thereof is set in the mouth 68 of the patient and is fixed to the teeth such as the teeth 69. Then, the other parts of the device are assembled in their proper position, and the apparatus is ready to be used, and wherein the present invention will ensure that parallel cuts will be made in any one of the teeth.

Minor changes in shape, size and rearrangement of details coming within the scope of the invention claimed may be resorted to in actual practice, as desired.

What is claimed is:

1. In combination with a dental hand piece of the type that includes a body member having a head on an end thereof, and a drilling bur driven from said head, the improvements consisting and providing a guiding parallelograph which comprises a cover that embraces a portion of said head, a securing element connecting said cover to said head, said cover including spaced apart generally flat side sections and an arcuate end section, rail units operatively connected to said end and side sections, each of said rail units comprising a support element affixed to said cover, first and second spaced apart cylindrical pins affixed to each support element, one of the pins of each rail unit having graduations thereon; a clamp having a pair of arcuate grooves for engaging and receiving said pins, a set screw extending through said clamp and engaging a pin, said clamp also having a cylindrical bore therein; a bracket including a shank projecting through said bore, and said bracket further including a body piece that is arranged at right angles with respect to said shank, said body piece having an elongated slot therein which defines spaced apart arms, a support unit embodying a base piece having a rounded lower surface, a retainer positioned above said base piece and connected thereto, there being coacting arcuate recesses in said retainer and base piece, a ball member arranged in engagement with said recesses, a stem affixed to said ball member, there being an annular groove in the upper portion of said stem receiving and engaging the arms and slot of said body piece, and pointed prongs depending from said base piece.

2. In a parallelograph, a cover including generally flat sections and an arcuate end section, rail units operatively connected to said end and side sections, each of said rail units comprising a support element affixed to said cover, first and second spaced apart cylindrical pins affixed to each support element, one of the pins of each rail unit having graduations thereon, a clamp having a pair of arcuate grooves for engaging and receiving said pins, a set screw extending through said clamp and engaging a pin, said clamp also having a cylindrical bore therein; a bracket including a shank projecting through said bore, and said bracket further including a body piece that is arranged at right angles with respect to said shank, said body piece having an elongated slot therein which defines spaced apart arms, a support unit embodying a base piece having a rounded lower surface, a retainer positioned above said base piece and connected thereto, there being coacting arcuate recesses in said retainer and base piece, a ball member arranged in engagement with said recesses, a stem affixed to said ball member, there being an annular groove in the upper portion of said stem receiving and engaging the arms and slot of said body piece, and pointed prongs depending from said base piece.

3. In combination with a dental hand piece of the type that includes a body member and head and drill, a cover connected to said head, a rail unit including a support element having a pair of spaced apart cylindrical pins affixed thereto, and said support element being affixed to said cover, graduations on one of said pins, a clamp having a pair of arcuate grooves for engaging and receiving said pins, a set screw extending through said clamp and engaging a pin, said clamp also having a cylindrical bore therein; a bracket including a shank projecting through said bore, and said bracket further including a body piece that is arranged at right angles with respect to said shank, said body piece having an elongated slot therein which defines spaced apart arms, a support unit embodying a base piece having a rounded lower surface, a retainer positioned above said base piece and connected thereto, there being coacting arcuate recesses in said retainer and base piece, a ball member arranged in engagement with said recesses, a stem affixed to said ball member, there being an annular groove in the upper portion of said stem receiving and engaging the arms and slot of said body piece, and pointed prongs depending from said base piece.

References Cited in the file of this patent

UNITED STATES PATENTS

| | | |
|---|---|---|
| 2,318,403 | Karlstrom | May 4, 1943 |
| 2,618,068 | Apple | Nov. 18, 1952 |
| 2,675,615 | Rosenberg | Apr. 20, 1954 |
| 2,724,899 | Stoll | Nov. 29, 1955 |